(12) United States Patent
Kim et al.

(10) Patent No.: US 12,131,675 B2
(45) Date of Patent: Oct. 29, 2024

(54) TEMPERATURE SENSOR FOR DISPLAY DRIVER CIRCUIT AND OPERATING METHOD THEREOF

(71) Applicant: Magnachip Semiconductor, Ltd., Cheongju-si (KR)

(72) Inventors: Jiyun Kim, Seoul (KR); Gilsung Roh, Cheongju-si (KR); Yongsup Lee, Cheongju-si (KR); Kwonyoung Oh, Sejong-si (KR); Youngjoon Kim, Seoul (KR); Jinseok Yang, Cheongju-si (KR); Sangkyung Kim, Daejeon (KR)

(73) Assignee: MAGNACHIP MIXED-SIGNAL, LTD., Cheongju-si (KR)

( * ) Notice: Subject to any disclaimer, the term of this patent is extended or adjusted under 35 U.S.C. 154(b) by 0 days.

(21) Appl. No.: 18/210,350

(22) Filed: Jun. 15, 2023

(65) Prior Publication Data

US 2024/0161666 A1     May 16, 2024

(30) Foreign Application Priority Data

Nov. 16, 2022   (KR) .......................... 10-2022-0153375

(51) Int. Cl.
*G09G 3/00* (2006.01)
*G01K 7/20* (2006.01)
*G09G 3/32* (2016.01)

(52) U.S. Cl.
CPC .............. *G09G 3/006* (2013.01); *G01K 7/20* (2013.01); *G09G 3/32* (2013.01); *G09G 2320/041* (2013.01); *G09G 2330/028* (2013.01); *G09G 2330/08* (2013.01); *G09G 2340/0435* (2013.01)

(58) Field of Classification Search
CPC .... G09G 3/006; G09G 3/32; G09G 2320/041; G09G 2330/028; G09G 2330/08; G09G 2340/0435; G01K 7/20
See application file for complete search history.

(56) References Cited

U.S. PATENT DOCUMENTS

| | | |
|---|---|---|
| 10,677,664 B1 | 6/2020 | Wong et al. |
| 11,514,990 B1 * | 11/2022 | Kumar .................. G11C 16/30 |
| 2008/0284493 A1 * | 11/2008 | Baek ........................ G05F 3/30 327/513 |
| 2011/0316823 A1 * | 12/2011 | Otani .................. G09G 3/3688 345/204 |
| 2017/0123446 A1 * | 5/2017 | Siddula .................. G05F 3/245 |
| 2018/0196301 A1 * | 7/2018 | Choi ................. G02F 1/133382 |

* cited by examiner

*Primary Examiner* — Lixi C Simpson
(74) *Attorney, Agent, or Firm* — POLSINELLI PC (57) ABSTRACT

The present disclosure relates to a temperature sensor provided in a display driver circuit and an operating method thereof. Disclosed is a temperature sensor provided in a display driver circuit including: a reference voltage generating unit configured to output a set reference voltage; a proportional voltage generating unit configured to output a proportional voltage proportional to a temperature of the circuit; a comparison unit configured to output a flag voltage by comparing magnitudes of the reference voltage and the proportional voltage; and a sensor control unit configured to control the reference voltage generating unit and the proportional voltage generating unit.

18 Claims, 10 Drawing Sheets

TEMPERATURE SENSOR FOR DISPLAY DRIVER CIRCUIT AND OPERATING METHOD THEREOF

CROSS REFERENCE TO RELATED APPLICATIONS

This application claims the benefit under 35 USC § 119(a) of Korean Patent Application No. 10-2022-0153375 filed on Nov. 16, 2022 in the Korean Intellectual Property Office, the entire disclosure of which is incorporated herein by reference for all purposes.

TECHNICAL FIELD

Various embodiments relate to a temperature sensor and an operating method thereof, and more particularly, to a temperature sensor integrated into a display driver circuit to sense a temperature of the display driver circuit and prevent the display driver circuit from operating in a specific high-temperature area and an operating method thereof.

BACKGROUND

In recent years, as the information age progresses, display devices of various types have been developed. For example, various kinds of display devices such as a liquid crystal display (LCD), plasma display panel (PDP), organic light emitting display (OLED), and micro light emitting display (Micro-LED) have been developed.

Such a display device may include a display panel having a plurality of pixels defined by a plurality of gate lines and a plurality of data lines, and a display driver integrated circuit (DDIC) for implementing a screen on the display panel.

Meanwhile, recently, as a display device, a smart phone, or a tablet personal computer (PC) including an ultra-high resolution display module and the like has been released.

As a resolution and frame rate of the display device increases, the amount of data input to and output from the display driver circuit greatly increases, and the display driver circuit that processes the data operates at a high temperature, which can dramatically decrease performance. In addition, there is a problem in that the display device malfunctions due to heat generated by the display driver circuit.

SUMMARY

The present disclosure is to solve the above problems and provides a temperature sensor integrated into a display driver circuit to sense a temperature of the display driver circuit and prevent the display driver circuit from operating in a specific high temperature area, and an operation method thereof.

The technical problems of the present disclosure are not limited to the above-described technical problems, and another technical problem not mentioned may be precisely understood by a person having ordinary skill in the art to which the present disclosure pertains.

One aspect is a temperature sensor provided in a circuit, including: a reference voltage generating unit configured to output a set reference voltage; a proportional voltage generating unit configured to output a proportional voltage proportional to a temperature of the circuit; a comparison unit configured to output a flag voltage by comparing magnitudes of the reference voltage and the proportional voltage; and a sensor control unit configured to control the reference voltage generating unit and the proportional voltage generating unit.

In addition, the proportional voltage generating unit may include: a proportional to absolute temperature (PTAT) current unit configured to generate a PTAT current proportional to the temperature of the circuit; a complementary to absolute temperature (CTAT) current unit configured to generate a CTAT current inversely proportional to the temperature of the circuit; and a calculation unit configured to generate the proportional voltage using a value of the PTAT current and a value of the CTAT current, and the CTAT current unit may include a variable resistor whose resistance value is changed under a control of the sensor control unit.

In addition, the comparison unit may output a first flag voltage when a voltage value of the proportional voltage is less than or equal to a voltage value of the reference voltage, and may output a second flag voltage for lowering the temperature of the circuit when a voltage value of the proportional voltage is greater than a voltage value of the reference voltage.

In addition, in a state in which the circuit is set in a test mode to maintain a first temperature, the sensor control unit may change a resistance value of the variable resistor based on a comparison result between a voltage value of the proportional voltage corresponding to the first temperature and a trimming table value.

In addition, the reference voltage generating unit may have a plurality of preset reference voltages, the sensor control unit may generate a reference voltage control signal for selecting one reference voltage from among the plurality of reference voltages and may transmit the reference voltage control signal to the reference voltage generating unit, and the reference voltage generating unit may output a voltage value of the reference voltage to increase or decrease based on the reference voltage control signal.

Further, another aspect is a display driver circuit, including: a temperature sensor configured to control heat generation of the display driver circuit; and a circuit control unit configured to perform an operation for lowering a temperature of the display driver circuit, and the temperature sensor may include: a reference voltage generating unit configured to output a set reference voltage; a proportional voltage generating unit configured to output a proportional voltage proportional to the temperature of the display driver circuit; a comparison unit configured to output a flag voltage by comparing magnitudes of the reference voltage and the proportional voltage; and a sensor control unit configured to control the reference voltage generating unit and the proportional voltage generating unit.

In addition, the proportional voltage generating unit may include: a PTAT current unit configured to generate a PTAT current proportional to the temperature of the circuit; a CTAT current unit configured to generate a CTAT current inversely proportional to the temperature of the circuit; and a calculation unit configured to generate the proportional voltage using a value of the PTAT current and a value of the CTAT current, and the CTAT current unit may include a variable resistor whose resistance value is changed under a control of the sensor control unit.

In addition, the comparison unit may output a first flag voltage when a voltage value of the proportional voltage is less than or equal to a voltage value of the reference voltage, and may output a second flag voltage and transmit the second flag voltage to the circuit control unit when a voltage value of the proportional voltage is greater than a voltage value of the reference voltage.

In addition, the circuit control unit may perform an operation for lowering a temperature of the display driver circuit, when receiving the second flag voltage.

In addition, as an operation for lowering the temperature of the display driver circuit, the circuit control unit may reset the display driver circuit, transmit an error message to a host, display an error message, or reduce a frame rate.

In addition, the circuit control unit may perform an operation of determining a specific temperature corresponding to the reference voltage as a current temperature of the display driver circuit, when receiving the first flag voltage.

Further, still another aspect is a method for operating a display driver circuit having a temperature sensor, including: setting a proportional voltage generating unit to output a first voltage when the display driver circuit is in a first temperature; controlling a reference voltage generating unit to output a reference voltage based on a temperature of the display driver circuit to be sensed; outputting a first flag voltage when a proportional voltage output by the proportional voltage generating unit is less than or equal to the reference voltage and outputting a second flag voltage when the proportional voltage is greater than the reference voltage; and lowering a temperature of the display driver circuit based on the second flag voltage.

In addition, the lowering a temperature of the display driver circuit may include: lowering the temperature of the display driver circuit, by resetting the display driver circuit, transmitting an error message to a host, displaying an error message, or reducing a frame rate.

In addition, the setting the proportional voltage generating unit may include: setting a resistance value of a variable resistor included in the proportional voltage generating unit such that the proportional voltage of the proportional voltage generating unit becomes the first voltage.

In addition, the setting a resistance value of a variable resistor may include: receiving a tester drive signal by the tester; setting the display driver circuit as a test mode to maintain the first temperature; and setting a resistance value of a variable resistor such that the proportional voltage becomes the first temperature based on a comparison result between a voltage value of the proportional voltage corresponding to the first temperature and a trimming table value.

In addition, the controlling a reference voltage generating unit may include: selecting one reference voltage from among the plurality of preset reference voltages and setting the selected reference voltage as the reference voltage.

Further, still another further aspect is a method for sensing a temperature of a display driver circuit, including: setting a reference voltage generating unit to select a reference voltage one by one from among a plurality of preset reference voltages and output a reference voltage such that a reference voltage increases or decreases; setting a proportional voltage generating unit to output a first voltage when the display driver circuit is at a first temperature; outputting a first flag voltage when a proportional voltage output by the proportional voltage generating unit is less than or equal to a reference voltage, and outputting a second flag voltage when the proportional voltage is greater than a reference voltage; and determining a temperature of the display driver circuit based on the first and second flag voltages.

In addition, the setting the proportional voltage generating unit may include: setting a resistance value of a variable resistor included in the proportional voltage generating unit such that the proportional voltage of the proportional voltage generating unit becomes the first voltage.

In addition, the setting a resistance value of a variable resistor may include: receiving a tester drive signal by the tester; setting the display driver circuit as a test mode to maintain the first temperature; and setting a resistance value of a variable resistor such that the proportional voltage becomes the first voltage based on a comparison result between a proportional voltage corresponding to the first temperature and a trimming table value.

In addition, the determining a temperature of the display driver circuit may include: determining a specific temperature corresponding to the reference voltage output by the reference voltage generating unit as a current temperature of the display driver circuit, when receiving the first flag voltage.

According to the temperature sensor and its operating method according to various embodiments of the present disclosure, the temperature sensor integrated into a display driver circuit may sense a temperature of the display driver circuit and prevent the display driver circuit from operating in a specific high-temperature area.

In addition, according to the temperature sensor and its operating method according to various embodiments of the present disclosure, precise temperature measurement of the display driver circuit is possible while using a simple structure.

In addition, according to the temperature sensor and its operating method according to various embodiments of the present disclosure, malfunction of the display device due to heat generated by the display driver circuit may be prevented.

The effects of the present disclosure are not limited to the above-described effects and other effects which are not described herein may be clearly understood by those skilled in the art from the following description of the embodiments of the present disclosure.

BRIEF DESCRIPTION OF THE DRAWINGS

In regard to the description of the drawings, the same or similar reference numerals may be used to refer to the same or similar elements.

DETAILED DESCRIPTION

Hereinafter, embodiments are described in more detail with reference to accompanying drawings and regardless of the drawing symbols, same or similar components are assigned with the same reference numerals and thus descriptions repetitive for those are omitted.

As used herein, the suffixes 'module' and 'part' are often used for elements in consideration of convenience in writing out the disclosure and may be used together or interchangeably, and the terms do not have any distinguishable meaning or role by themselves. In addition, the terms, 'module' or 'part', may mean software components or hardware components such as a field programmable gate array (FPGA), an application specific integrated circuit (ASIC). The 'part' or 'module' performs certain functions. However, the 'part' or 'module' is not meant to be limited to software or hardware. The 'part' or 'module' may be configured to be placed in an addressable storage medium or to restore one or more processors. Thus, for one example, the 'part' or 'module' may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the 'part' or 'module' may be combined with a smaller number of components and 'parts' or 'modules' or may be further divided into additional components and 'parts' or 'modules'.

Methods or algorithm steps described relative to some embodiments of the present disclosure may be directly implemented by hardware and software modules that are executed by a processor or may be directly implemented by a combination thereof. The software module may be resident on a random access memory (RAM), a flash memory, a read only memory (ROM), an erasable programmable read only memory (EPROM), an electrically erasable programmable read only memory (EEPROM), a resistor, a hard disk, a removable disk, a compact disc-ROM (CD-ROM), or any other type of recording medium known to those skilled in the art. An exemplary recording medium is coupled to a processor and the processor may read information from the record medium and may record the information in a storage medium. In another way, the recording medium may be integrally formed with the processor. The processor and the recording medium may be resident within an ASIC. The ASIC may be resident within a user's terminal.

In addition, in describing an aspect, if a description of a related known art in detail is deemed to unnecessarily obscure the substance of the present disclosure, description of such art will be omitted. Also, it should be understood that the accompanying drawings are used for convenience of explaining the disclosed embodiments, and the technical concept of the present disclosure are not limited by the accompanying drawings, and that the accompanying drawings include all the modifications, equivalents or replacements thereof included in the spirit and technical scope of the disclosure.

While terms such as the first and the second, etc., may be used to describe various components, the components are not limited by the terms mentioned above. The terms are used only for distinguishing between one component and other components.

When a component is referred to as being 'connected to' or 'accessed to' another component includes both a case where one component is directly connected or accessed to another component and a case where a further another component is interposed between them. Meanwhile, when a component is referred to as being 'directly connected to' or 'directly accessed to' another component indicates that a further another component is not interposed between them.

Figure 1:
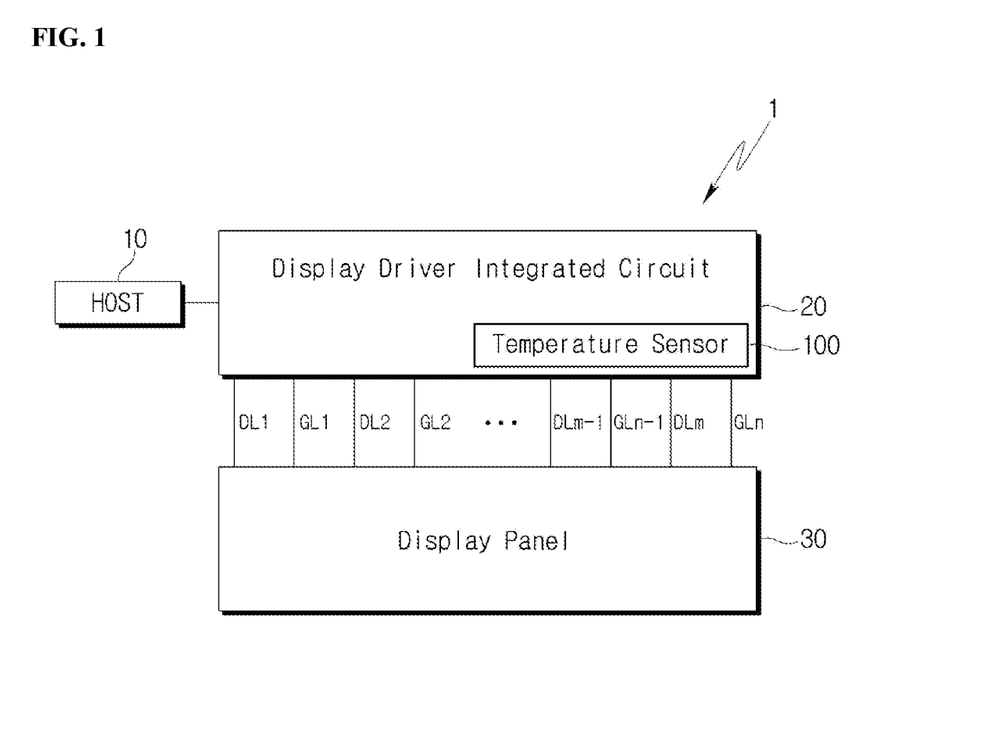
FIG. 1 is a diagram showing a schematic configuration of a display device according to an aspect of the present disclosure.

FIG. 1 is a diagram showing a schematic configuration of a display device according to an aspect of the present disclosure.

According to aspects of the disclosure, a display device 1 is an electronic device having a display function or a device including a communication function and may capable of displaying an image or video, such as a television, smartphone, tablet personal computer, mobile phone, video phone, e-book reader, computer, camera, or wearable device.

Referring to FIG. 1, a display device 1 may be configured to include a display driver integrated circuit 20 that receives data or commands from a host 10 and a display panel 30 driven by the display driver circuit 20.

The display driver circuit 20 may provide a data signal to the display panel 30 based on an image control signal received from the host 10.

According to some aspects, the display driver circuit 20 may be connected to the display panel 30 in a Chip-On-Plastic (COP) or Chip-On-Film (COF) method, and may provide a plurality of data lines (DL1 to DLm) and a plurality of gate lines (GL1 to GLn) arranged on the display panel 30 with data signals and/or control signals.

For example, the display driver circuit 20 may sequentially provide the plurality of gate lines (GL1 to GLn) with gate-on signals (e.g., a gate voltage of a logic high level) in response to the gate control signal (GCS) and provide the plurality of data lines (DL1 to DLm) with image signals in response to the data control signal (DCS).

According to some aspects of the present disclosure, the display driver circuit 20 may include a temperature sensor 100 for controlling heat generation of the display driver circuit 20.

The temperature sensor 100 may sense a temperature of the display driver circuit 20 and, when the temperature of the display driver circuit 20 is equal to or higher than a specific temperature, an operation for lowering the temperature of the display driver circuit 20 may be performed. That is, the temperature sensor 100 may prevent the display driver circuit 20 from entering and operating in a specific high-temperature area. Details of the temperature sensor 100 will be described in more detail below.

The display panel 30 may include a plurality of pixels arranged in rows and columns. The display panel 30 may be implemented as one among, for example, a light emitting diode (LED) display, an organic LED (OLED) display, an active-matrix OLED (AMOLED) display, an electrochromic display (ECD), a digital mirror device (DMD), and an actuated display (AMD), grating light valve (GLV), plasma display panel (PDP), electro luminescent display (ELD), and vacuum fluorescent display (VFD), but is not limited thereto.

According to some aspects, the display panel 30 may include a plurality of gate lines (GL1 to GLn) (e.g., n is a natural number) arranged in rows, a plurality of data lines (DL1 to DLm) (e.g., m is a natural number) arranged in columns, and pixels formed at intersections of a plurality of the gate lines (GL1 to GLn) and a plurality of data lines (DL1 to DLm).

According to some aspects, the display panel 30 includes a plurality of horizontal lines, and one horizontal line may be composed of pixels connected to one gate line. For example, during one horizontal time H, pixels arranged on one horizontal line may be driven, and during the next one horizontal time H, pixels arranged on another horizontal line may be driven.

The pixels may include an LED and a diode driving circuit that independently drives the light emitting diode. The diode driving circuit may be connected to one gate line and one data line, and the light emitting diode may be connected between the diode driving circuit and a power supply voltage (e.g., ground voltage).

The diode driving circuit may include a switching element, for example, a thin film transistor (TFT) connected to the gate lines (GL1 to GLn). When the switching element is turned on when a gate-on signal from the gate lines (GL1 to GLn) is applied thereto, the diode driving circuit may supply, to the light emitting diode, an image signal (e.g., a pixel signal) received from the data lines (DL1 to DLm) connected to the diode driving circuit. The light emitting diode may output an optical signal in correspondence with the image signal.

According to the aspect, a pixel may include sub-pixels of a red element R outputting a red light, a green element G outputting a green light, and a blue element B outputting a blue light. In the display panel 30, subpixels of the red, green, and blue elements may be arranged in various ways.

According to some aspects, the sub-pixels of the display panel 30 may be repeatedly arranged in an order of R, G, B, G or B, G, R, G, and the like. For example, pixels of the display panel 30 may be arranged according to an RGB stripe structure or an RGB gentile structure but are not limited thereto.

Figure 2:
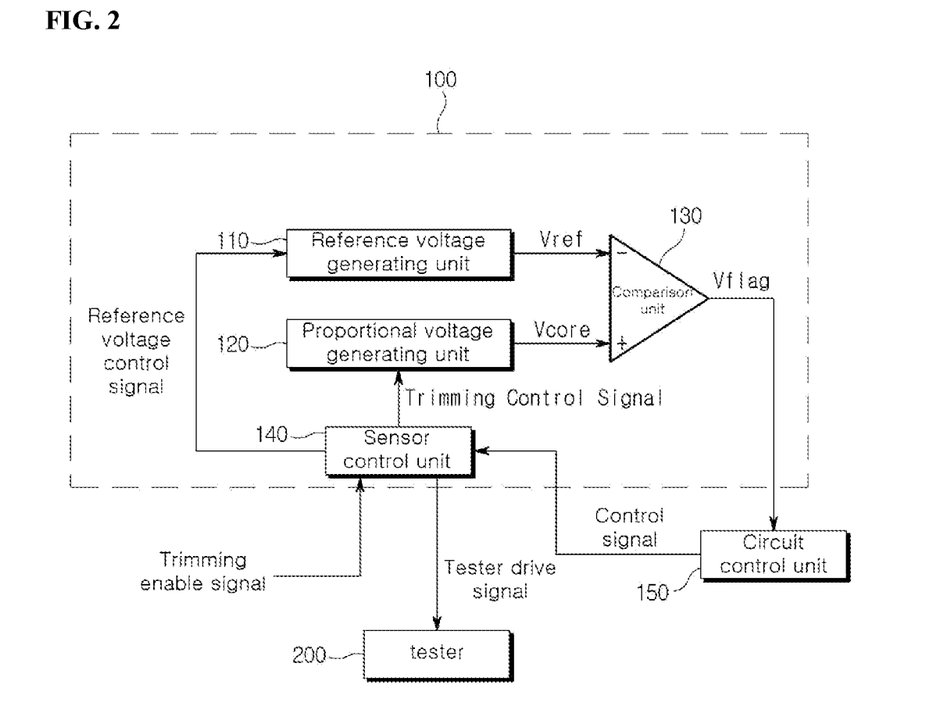
FIG. 2 is a diagram conceptually illustrating a temperature sensor according to an aspect of the present disclosure.

FIG. 2 is a diagram conceptually illustrating a temperature sensor according to an aspect of the present disclosure.

According to aspects of the present disclosure, the temperature sensor 100 is integrated into the display driver circuit 20 to sense a temperature of the display driver circuit 20, and when the temperature of the display driver circuit 20 is higher than a specific temperature, an operation for lowering the temperature of the display driver circuit 20 may be performed. That is, the temperature sensor 100 may prevent malfunction of the display device 1 due to a rising temperature of the display driver circuit 20.

Referring to FIG. 2, the temperature sensor 100 may include a reference voltage generating unit 110, a proportional voltage generating unit 120, a comparison unit 130, and a sensor control unit 140.

The reference voltage generating unit 110 may output a reference voltage Vref having a constant voltage value. The reference voltage Vref output by the reference voltage generating unit 110 may be a voltage having a constant voltage level corresponding to a specific temperature of the display driver circuit 20. That is, the reference voltage Vref may be a voltage set to determine whether a temperature of the display driver circuit 20 is equal to or higher than a specific temperature.

According to some aspects, the reference voltage generating unit 110 may generate one reference voltage Vref selected according to a reference voltage control signal of the sensor control unit 140 from among a plurality of reference voltages (Vref1 to Vrefn) (e.g., n is a natural number). The plurality of reference voltages (Vref1 to Vrefn) may have voltage levels respectively corresponding to each of different temperatures. According to the aspect, a voltage value of the reference voltage (Vrefm) increases as a value of m (1≤m≤n) increases, and a corresponding temperature may increase.

The proportional voltage generating unit 120 may output a proportional voltage Vcore having a voltage value proportional to a temperature change of the display driver circuit 20. For example, the proportional voltage generating unit 120 may output a proportional voltage Vcore that increases linearly when a temperature of the display driver circuit 20 increases and decreases linearly when a temperature of the display driver circuit 20 decreases. The proportional voltage generating unit 120 will be described in detail below.

The comparison unit 130 may compare a magnitude of the reference voltage Vref output by the reference voltage generating unit 110 and a magnitude of the proportional voltage Vcore output by the proportional voltage generating unit 120.

According to some aspects, the comparison unit 130 may receive the reference voltage Vref and the proportional voltage Vcore in the form of analog voltages, and output a comparison result as a flag voltage Vflag in the form of an analog voltage. For example, when a voltage value of the proportional voltage Vcore is smaller than or equal to a voltage value of the reference voltage Vref, the comparison unit 130 may output a flag voltage Vflag having a voltage of 0V corresponding to a logic low level, and when a voltage value of the proportional voltage Vcore is greater than a voltage value of the reference voltage Vref, the comparison unit 130 may output a flag voltage Vflag having a voltage corresponding to a logic high level (e.g., 3.3V).

A circuit control unit 150 may perform an operation for lowering a temperature of the display driver circuit 20 when a flag voltage Vflag of 3.3V, or other suitable voltage, is received from the comparison unit 130.

According to some aspects, the circuit control unit 150 is a component included in the display driver circuit 20 and may perform the following operations in response to receiving a flag voltage Vflag of 3.3V from the comparison unit 130.

As an operation for lowering a temperature of the display driver circuit 20, the circuit control unit 150 may reset the display driver circuit 20, or output an error message to the host 10 to request that the host 10 determine whether to operate the display driver circuit 20, or display an error message notifying a high-temperature state of the display driver circuit 20 on the display panel 30, or reduce a frame rate of image data displayed on the display panel 30. That is, the circuit control unit 150 may prevent the display driver circuit 20 from operating in a specific high temperature area in advance.

Hereinafter, components, operations, and characteristics of the proportional voltage generating unit 120 that measures a temperature of the display driver circuit 20 will be described.

Figure 3:
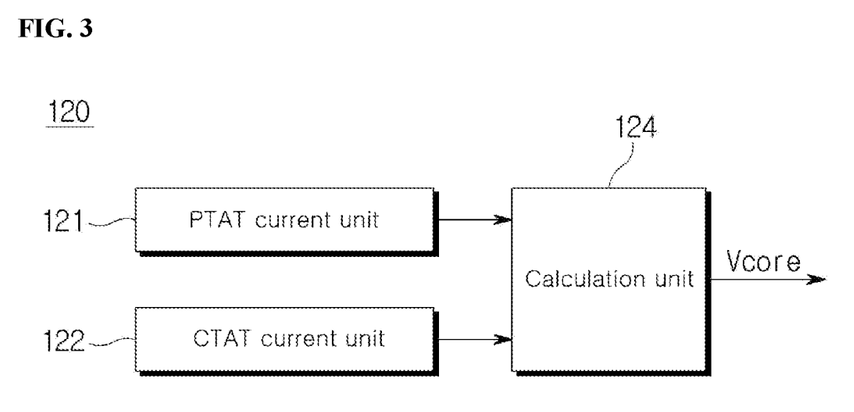
FIG. 3 is a block diagram showing a proportional voltage generating unit included in a temperature sensor according to an aspect of the present disclosure.
Figure 4:
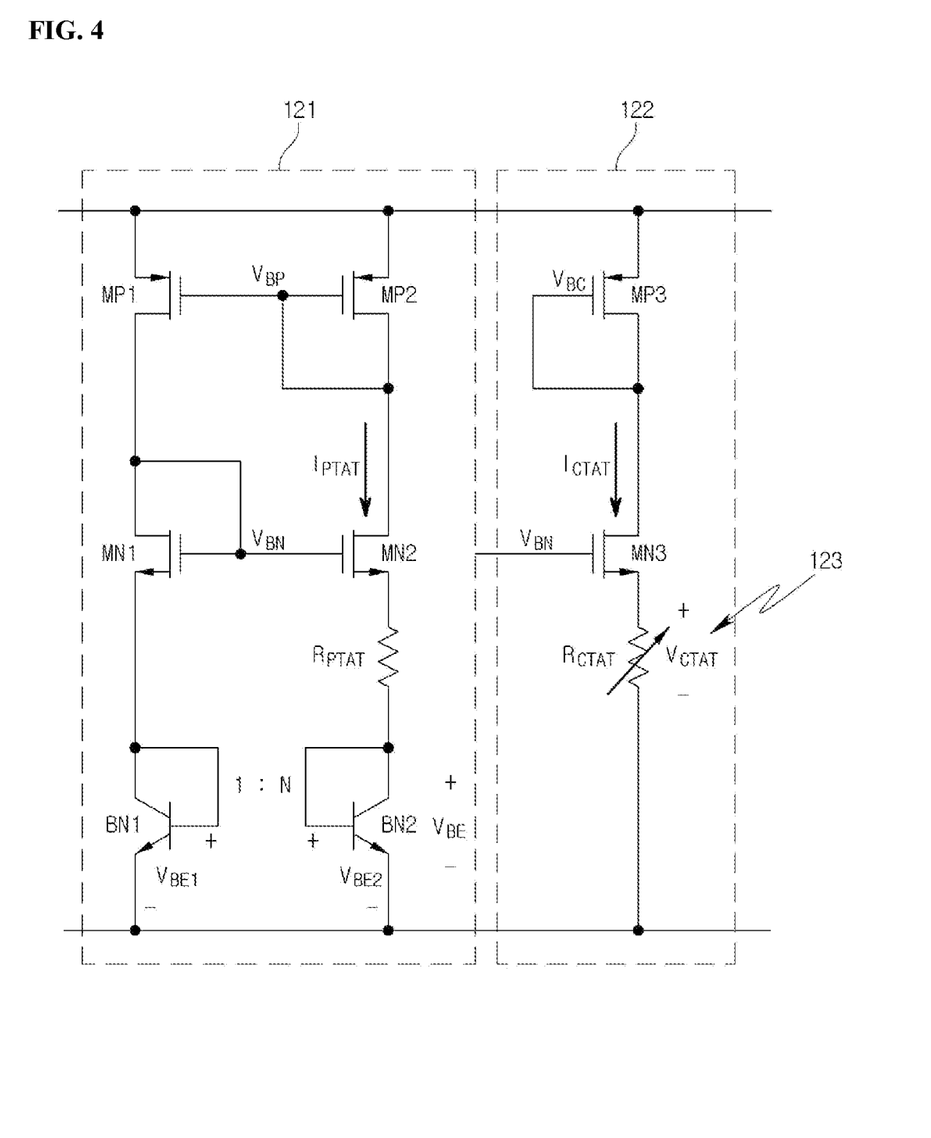
FIG. 4 is a circuit diagram schematically showing a proportional to absolute temperature (PTAT) current unit and a complementary to absolute temperature (CTAT) current unit of a proportional voltage generating unit according to an aspect of the present disclosure.
Figure 5:
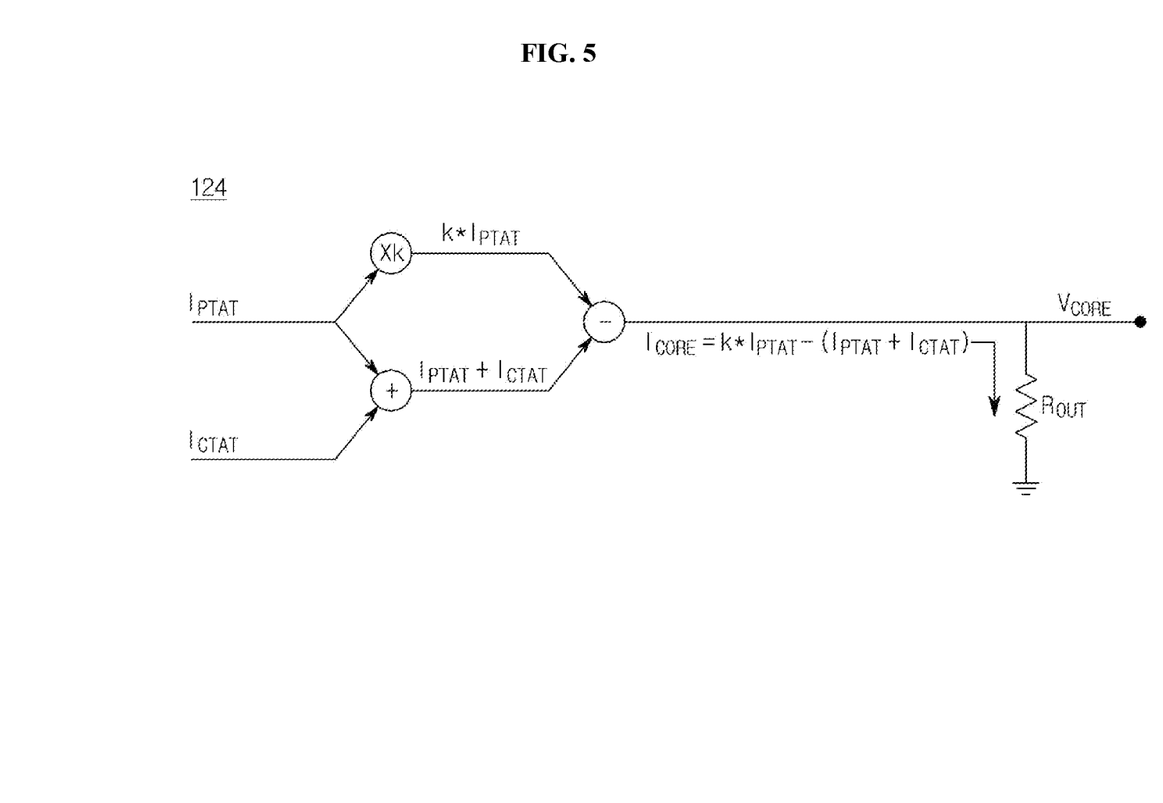
FIG. 5 is a diagram showing a specific calculation process of a calculation unit of a proportional voltage generating unit according to an aspect of the present disclosure.
Figure 6:
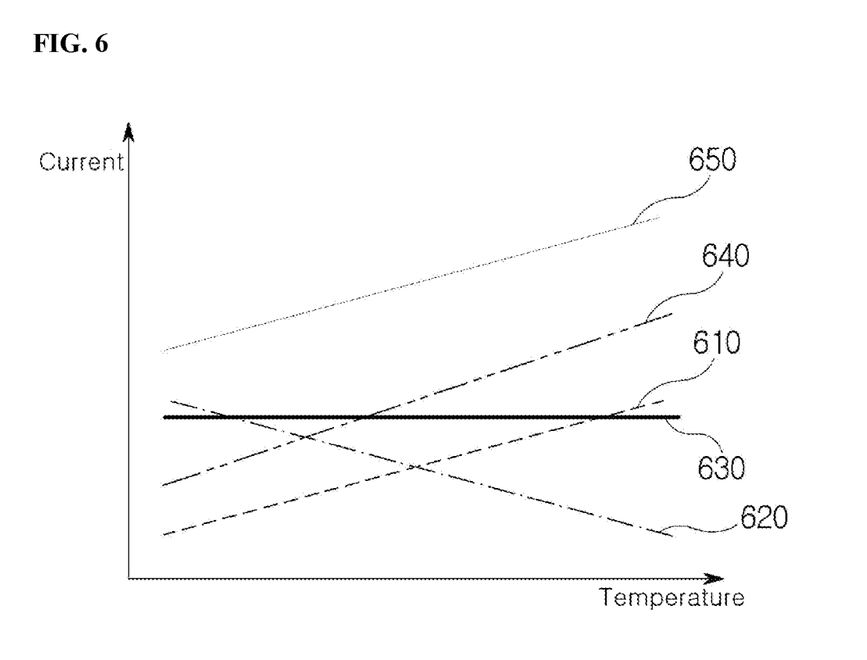
FIG. 6 is a graph explaining current characteristics appearing in a proportional voltage generating unit based on a temperature of a display driver circuit according to an aspect of the present disclosure.

FIG. 3 is a block diagram showing a proportional voltage generating unit included in a temperature sensor 100 according to an aspect of the present disclosure, FIG. 4 is a circuit diagram schematically showing a proportional to absolute temperature (PTAT) current unit 121 and a complementary to absolute temperature (CTAT) current unit 122 of the proportional voltage generating unit 120 according to an aspect of the present disclosure, FIG. 5 is a diagram showing a specific calculation process of a calculation unit 124 of the proportional voltage generating unit 120 according to an aspect of the present disclosure, and FIG. 6 is a graph explaining current characteristics appearing in the proportional voltage generating unit 120 based on a temperature of the display driver circuit 20 according to an aspect of the present disclosure.

Referring to FIGS. 3 to 6, the proportional voltage generating unit 120 may include a PTAT current unit 121 that generates a PTAT current 610 proportional to a temperature of the display driver circuit 20, a CTAT current unit 122 that generates a CTAT current 620 inversely proportional to a temperature of the display driver circuit 20 and includes a variable resistor $R_{CTAT}$ 123 having a resistance value that is determined based on the generated CTAT current value, and a calculation unit 124 that performs calculations on the PTAT current 610 and CTAT current 620.

In the PTAT current unit 121, a circuit thereof may be configured to increase magnitudes of a voltage and current when the temperature of the display driver circuit 20 increases. That is, as shown in FIG. 6, the PTAT current 610 generated by the PTAT current unit 121 has a positive slope that is proportional to the temperature of the display driver circuit 20.

In the CTAT current unit 122, a circuit thereof may be configured to decrease magnitudes of a voltage and current when the temperature of the display driver circuit 20 increases. That is, as shown in FIG. 6, the CTAT current 620 generated by the CTAT current unit 122 has a negative slope that is inversely proportional to the temperature of the display driver circuit 20.

Referring to FIG. 4, to generate the PTAT current 610, the PTAT current unit 121 may include a first P-type metal oxide semiconductor field effect transistor (MOSFET) transistor MP1, a second P-type MOSFET transistor MP2, a first N-type MOSFET transistor MN1, a second N-type MOSFET transistor MN2, and a first N-type bipolar junction transistor (BJT) BN1, a second N-type BJT BN2, and a PTAT resistor $R_{PTAT}$. The CTAT current unit 122 may include a third P-type MOSFET transistor MP3 and a third N-type MOSFET transistor MN3. The first P-type MOSFET transistor MP1, the second P-type MOSFET transistor MP2, the first N-type MOSFET transistor MN1, and the second N-type MOSFET transistor MN2 are current mirrors and cause the same first current $I_{PTAT}$ to flow between the MP1 and MN1 and between the MP2 and MN2. Also, voltage values of the source terminals of the MN1 and MN2 become the same. Then, a relationship of Equation 1 below is established between a voltage $V_{BE1}$ across two ends of the first N-type BJT BN1 and a voltage $V_{BE2}$ across two ends of the second N-type BJT BN2.

$$V_{BE1}=(I_{PTAT}*R_{PTAT})+V_{BE2} \quad \text{Equation 1}$$

Then, the first current $I_{PTAT}$ becomes as shown in Equation 2 below.

$$I_{PTAT}=(V_{BE1}-V_{BE2})/R_{PTAT}=Vt*\ln(N)/R_{PTAT} \quad \text{Equation 2}$$

The first current is represented by Vt=kT/q, where k is Boltzmann constant, T is an absolute temperature, and q is an electric charge of an electron. Then, Vt becomes 25.2 mV when T is 293° K (e.g., 20 degrees), and increases by 0.083 mV when the temperature increases by 1° K. Therefore, the first current $I_{PTAT}$ becomes a current increasing in accordance with a temperature and has a PTAT characteristic.

Referring to FIG. 4, $V_{BN}$ is applied to a gate of the third N-type MOSFET transistor MN3, and $V_{BN}=V_{BE1}+V_{GS1}$. Here, $V_{GS1}$ is a voltage between a gate and source of the MN1. When it comes to variations of a base-emitter voltage $V_{BE1}$ of the first N-type BJT BN1, the voltage decreases as a temperature increases from approximately −2.0 mV/T to −1.2 mV/T, and as a result, a voltage $V_{BN}$ applied to a gate of the MN1 also decreases according to the temperature, and as a result, a current value of the second current $I_{CTAT}$ flowing to a drain of the MN3 also decreases. Accordingly, the second current $I_{CTAT}$ becomes a current that decreases as the temperature increases, and thus has a CTAT characteristic.

According to some aspects of the present disclosure, the CTAT current unit 122 may further include a variable resistor $R_{CTAT}$ 123 for adjusting a current value of the CTAT current 620. A magnitude of the second current $I_{CTAT}$ flowing through the drain of the MN3 is determined by a gate-source voltage $V_{GS3}$ of the MN3. Also, since $V_{GS3}$ is determined by $V_{BN}-(I_{CTAT}*R_{CTAT})$, the magnitude of the second current $I_{CTAT}$ may be adjusted by changing a value of the variable resistor $R_{CTAT}$ 123.

For example, a sum of the PTAT current 610 and CTAT current 620 (630, $I_{PTAT}+I_{CTAT}$) may be different for each of the display driver circuits 20 due to a process variation during manufacturing processes of the display driver circuits 20.

Accordingly, even at the same temperature, the proportional voltage generating unit 120 outputs different proportional voltages Vcore for each display driver circuit 20.

To solve this problem, the sensor control unit 140 may adjust the CTAT current 620 by changing a resistance value of the variable resistor $R_{CTAT}$ 123 included in the CTAT current unit 122.

That is, as illustrated in FIG. 6, the proportional voltage generating unit 120 may maintain the sum of PTAT current 610 and CTAT current 620 (630, $I_{PTAT}+I_{CTAT}$) uniformly in all display driver circuits 20 through the variable resistor $R_{CTAT}$ 123 changed by the sensor control unit 140, and thus, variations due to process variations of display driver circuits 20 may be reduced.

In this way, by adjusting the CTAT current 620 of the CTAT current unit 122 by changing the resistance value of the variable resistor $R_{CTAT}$ 123 through a trimming control signal generated by the sensor control unit 140, the proportional voltage generating unit 120 may output the proportional voltage Vcore having a specific voltage level at a specific temperature of the display driver circuit 20.

According to some aspects of the present disclosure, the sensor control unit 140 may output the trimming control signal to the proportional voltage generating unit 120 when the display driver circuit 20 is set in a test mode to maintain a specific temperature. The proportional voltage generating unit 120 may change the resistance value of the variable resistor $R_{CTAT}$ 123 based on the trimming control signal and output a proportional voltage Vcore having a specific voltage level corresponding to a specific temperature.

According to the aspect, since the sensor control unit 140 generates the trimming control signal for changing the resistance value of the variable resistor $R_{CTAT}$ 123, and the proportional voltage generating unit 120 adjusts the CTAT current 620 of the CTAT current unit 122 by changing the resistance value of the variable resistor $R_{CTAT}$ 123 based on the trimming control signal, it is possible to output the proportional voltage Vcore having a specific voltage level at a specific temperature of the display driver circuit 20.

Referring to FIG. 5, the calculation unit 124 may perform calculations on the PTAT current $I_{PTAT}$ and the CTAT current $I_{CTAT}$. For example, the calculation unit 124 may generate a proportional current Icore 640 having a current value obtained by subtracting the sum of the PTAT current $I_{PTAT}$ and the CTAT current $I_{CTAT}$ (630) from a value obtained by increasing the PTAT current $I_{PTAT}$ by k-fold k*$I_{PTAT}$ (650). In this case, since the sum of the PTAT current (PTAT and the CTAT current $I_{CTAT}$ (630) has an almost constant value regardless of a temperature as illustrated in FIG. 6, the proportional current Icore 640 may increase or decrease proportional to the temperature.

That is, the calculation unit 124 may generate the same proportional current Icore 640 at the same temperature for each display driver circuit 20, output the same proportional voltage Vcore at the same temperature for each display driver circuit 20, and also output a proportional voltage Vcore that is directly proportional to a temperature at the same temperature for each display driver circuit 20.

Figure 7:
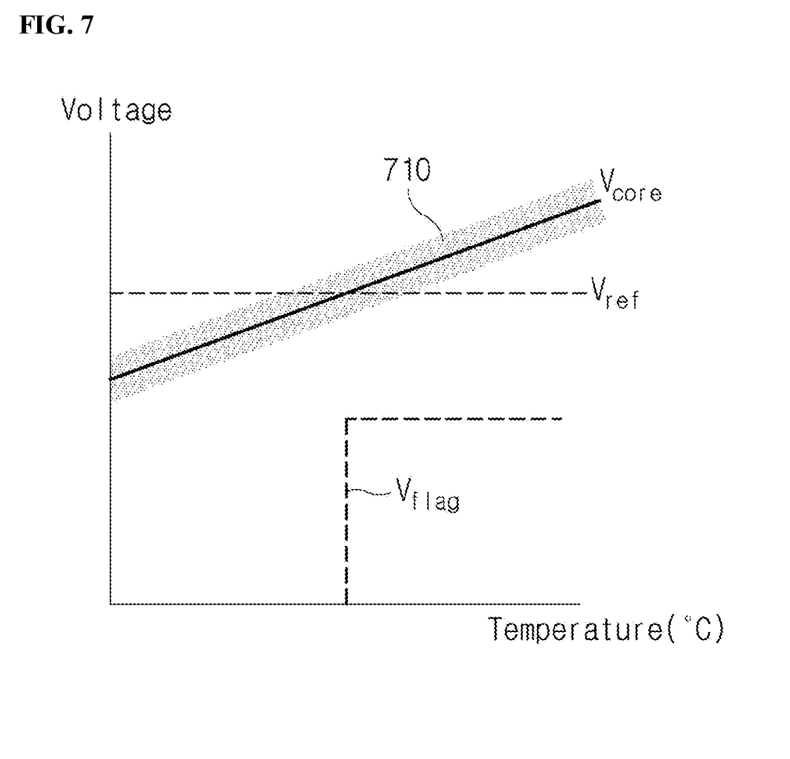
FIG. 7 is a graph for explaining characteristics of each of a reference voltage Vref, proportional voltage Vcore, and flag voltage Vflag output by a reference voltage generating unit, proportional voltage generating unit, and comparison unit based on a temperature of a display driver circuit according to an aspect of the present disclosure.

FIG. 7 is a graph for explaining characteristics of each of the reference voltage Vref, proportional voltage Vcore, and flag voltage Vflag output by the reference voltage generating unit 110, proportional voltage generating unit 120, and comparison unit 130 based on a temperature of the display driver circuit 20 according to an aspect of the present disclosure.

Referring to FIG. 7, the reference voltage generating unit 110 may output a reference voltage Vref of a constant voltage level corresponding to a specific temperature such that the display driver circuit 20 operates below a specific temperature.

The proportional voltage generating unit 120 may output the proportional voltage Vcore that increases or decreases proportionally to the temperature of the display driver circuit 20. At this time, the sensor control unit 140 may slightly adjust a magnitude of the proportional voltage Vcore output by the proportional voltage generating unit 120 by changing the variable resistor $R_{CTAT}$ 123 (for example, a gray shading section 710 shown in FIG. 7).

That is, using the variable resistor $R_{CTAT}$ 123, the sensor control unit 140 may precisely control the voltage value of the proportional voltage Vcore at a specific temperature of the display driver circuit 20 such that the specific voltage is output.

The comparison unit 130 compares the voltage value of the proportional voltage Vcore with the voltage value of the reference voltage Vref, and when the voltage value of the proportional voltage Vcore is greater than the reference voltage Vref, the comparison unit 130 may output a flag voltage having a voltage value of a logic high level.

According to some aspects, the comparison unit 130 may receive the reference voltage Vref and the proportional voltage Vcore in the form of an analog voltage, respectively, and output a result of comparing the reference voltage Vref and the proportional voltage Vcore as an analog voltage.

Figure 8:
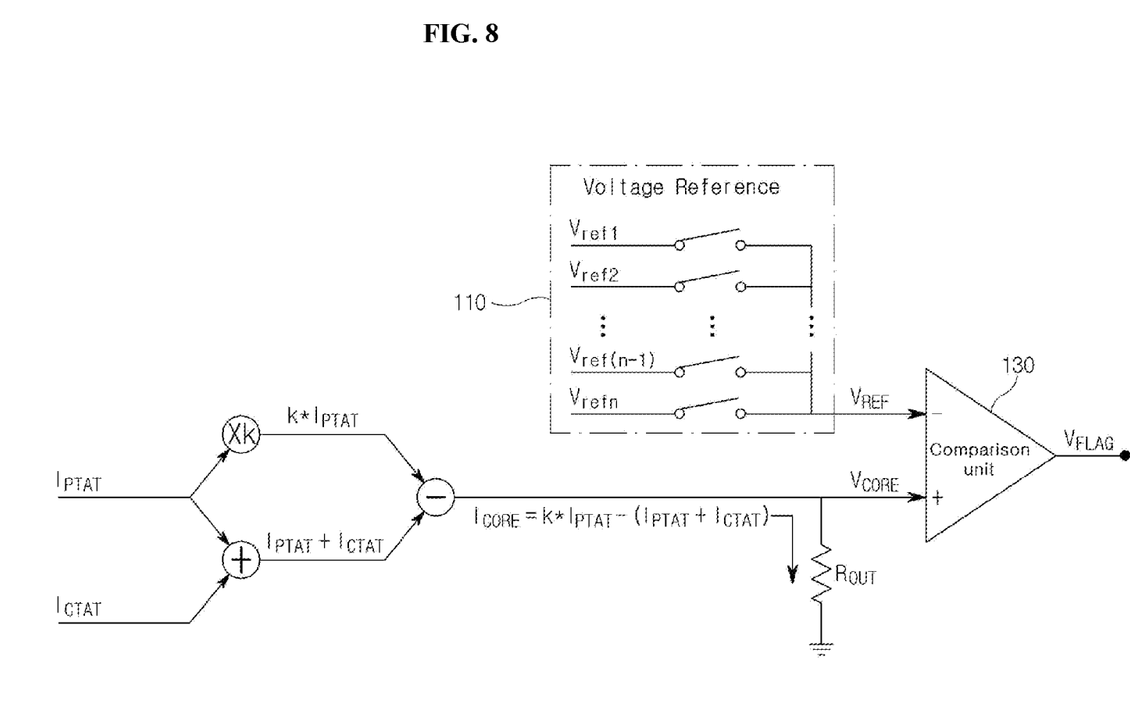
FIG. 8 is a circuit diagram for explaining a reference voltage generating unit included in a temperature sensor according to an aspect of the present disclosure.
Figure 9:
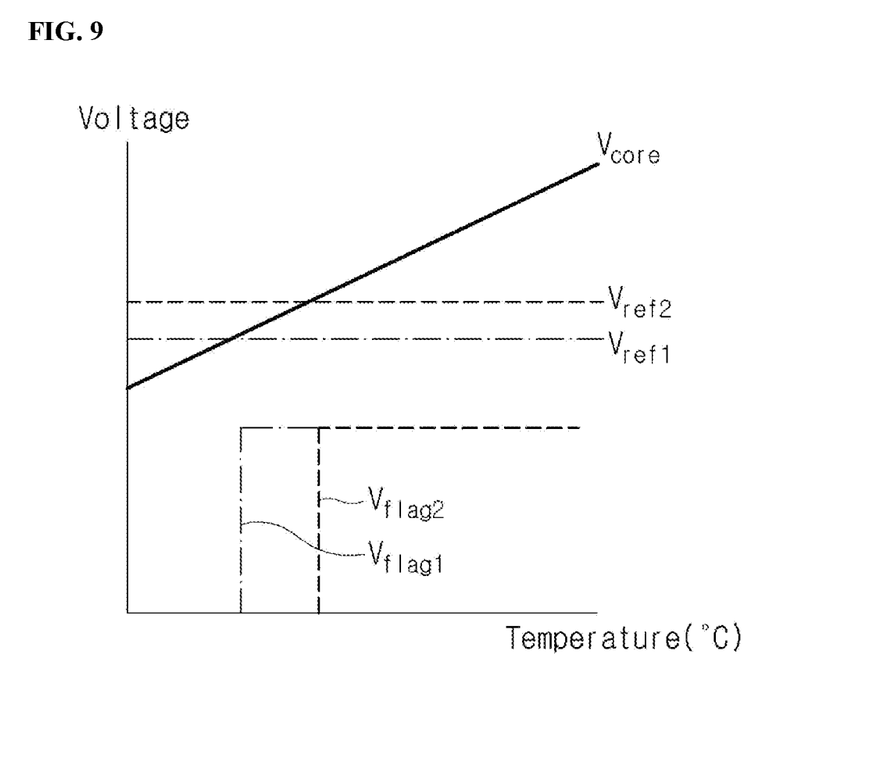
FIG. 9 is a graph for explaining temperature characteristics of a reference voltage output by a reference voltage generating unit based on a temperature of a display driver circuit according to an aspect of the present disclosure.

FIG. 8 is a circuit diagram for explaining the reference voltage generating unit 110 included in the temperature sensor 100 according to the aspect of the present disclosure, and FIG. 9 is a graph for explaining temperature characteristics of the reference voltage Vref output by the reference voltage generating unit 110 based on the temperature of the display driver circuit 20 according to an aspect of the present disclosure.

First, referring to FIG. 8, the reference voltage generating unit 110 may output any one reference voltage Vref selected among a plurality of reference voltages (Vref1 to Vrefn) according to a reference voltage control signal generated by the sensor control unit 140. The plurality of reference voltages (e.g., Vref1 to Vrefn) may be voltages having voltage levels respectively corresponding to each of specific temperatures of the display driver circuit 20.

Next, referring to FIG. 9, the sensor control unit 140 may generate a first reference voltage control signal such that the display driver circuit 20 operates at the first temperature or less. In this case, the reference voltage generating unit 110 may output a first reference voltage Vref1 corresponding to the first reference voltage control signal and the comparison unit 130 compares magnitudes of the first reference voltage Vref1 and the proportional voltage Vcore, and when the voltage value of the proportional voltage Vcore is greater than the voltage value of the first reference voltage Vref1, the comparison unit 130 may output a first flag voltage Vflag1 having a voltage value of a logic high level.

In addition, the sensor control unit 140 may generate a second reference voltage control signal such that the display driver circuit 20 operates at a second temperature or lower, while the second temperature is higher than the first temperature. In this case, the reference voltage generating unit 110 outputs a second reference voltage Vref2 having a higher voltage value than the first reference voltage Vref1 based on the second reference voltage control signal, the comparison unit 130 compares magnitudes of the second reference voltage Vref2 and the proportional voltage Vcore, and when the voltage value of the proportional voltage Vcore is greater than the voltage value of the second reference voltage Vref2, the comparison unit 130 may output a second flag voltage Vflag2 having a voltage value of a logic high level.

That is, the sensor control unit 140 may generate a reference voltage control signal for selecting one reference voltage Vref among a plurality of reference voltages (Vref1 to Vrefn) such that the display driver circuit 20 operates below a specific temperature, and the reference voltage generating unit 110 may output a reference voltage Vref corresponding to a specific temperature based on a reference voltage control signal transmitted by the sensor control unit 140.

According to some aspects of the present disclosure, the sensor control unit 140 may generate a reference voltage control signal such that a voltage value of the reference voltage Vref output by the reference voltage generating unit 110 increases or decreases.

For example, the sensor control unit 140 may generate a reference voltage control signal that causes the reference voltage generating unit 110 to output a first reference voltage Vref1 and a second reference voltage Vref2 greater than the first reference voltage Vref1.

When the circuit control unit 150 checks the current temperature of the display driver circuit 20, the circuit control unit 150 may command the sensor control unit 140 to output a control signal and to sequentially change a reference voltage. Upon receiving the control signal, the sensor control unit 140 may output a reference voltage control signal to the reference voltage generating unit 110. The comparison unit 130 may generate a flag voltage Vflag by comparing the sequentially changed reference voltage Vref with the proportional voltage Vcore. According to the comparison result, when the circuit control unit 150 receives the flag voltage of 0V corresponding to a logic low level, the circuit control unit 150 may estimate a temperature corresponding to a reference voltage Vref and determine the current temperature value of the display driver circuit 20 accordingly.

For example, it is presumed that the reference voltage corresponding to the current temperature is Vrefm. A reference voltage control signal for causing the sensor control unit 140 to output the first to m-th reference voltages (e.g., Vref1 to Vrefm) is transmitted to the reference voltage generating unit 110. The comparison unit 130 compares a proportional voltage Vcore with the first to m−1-th reference voltages (e.g., Vref1 to Vrefm−1). Since the proportional voltage Vcore is greater than the first to m−1-th reference voltages (e.g., Vref1 to Vrefm−1), the comparison unit 130 outputs a flag voltage Vflag of 3.3V. Then, the reference voltage generating unit 110 outputs the m-th reference voltage Vrefm, and the comparison unit 130 compares a proportional voltage Vcore with the m-th reference voltage Vrefm. Since the proportional voltage Vcore becomes equal to or less than the m-th reference voltage Vrefm, the comparison unit 130 outputs a flag voltage Vflag corresponding to 0V. When the circuit control unit 150 receives the flag voltage Vflag corresponding to 0V, the circuit control unit 150 may determine a specific temperature corresponding to the m-th reference voltage Vrefm as the current temperature of the display driver circuit 20.

In addition, the circuit control unit 150 of the present disclosure may check the current temperature of the display driver circuit 20, perform an operation for lowering the temperature of the display driver circuit, and stop the operation. That is, since the temperature change of the display driver circuit 20 may be monitored in real time, the temperature of the display driver circuit 20 may be controlled accordingly, and the control method may be to reduce a frame rate of image data displayed on the display panel 30.

Figure 10:
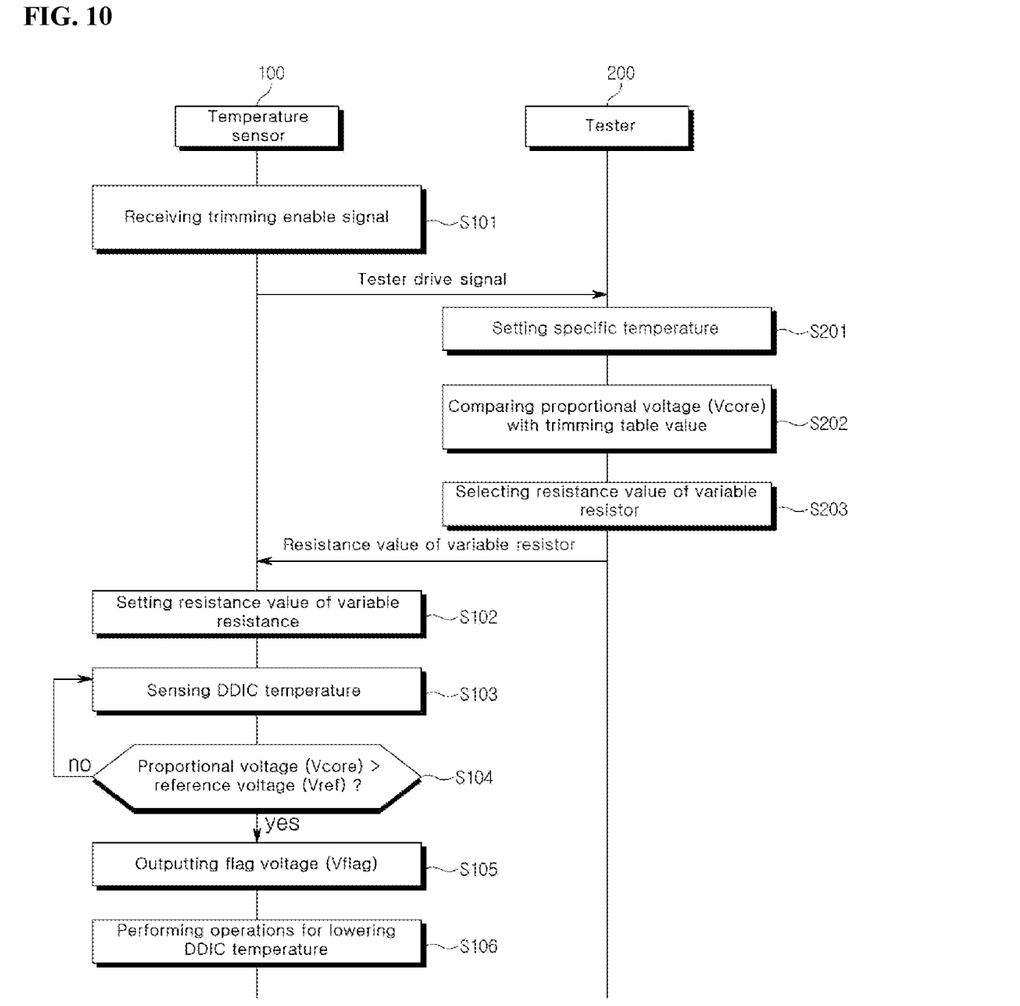
FIG. 10 is a diagram for explaining an operation method of a temperature sensor according to an aspect of the present disclosure.

FIG. 10 is a diagram for explaining an operation method of the temperature sensor according to the aspect of the present disclosure.

Hereinafter, a tester 200 set a resistance value of the variable resistor $R_{CTAT}$ 123 to make the same specific voltage be output at the same specific temperature for each display driver circuit 20.

In addition, although the tester 200 is expressed as an independent device separate from the temperature sensor 100 in FIG. 10, it is not limited thereto, and the tester 200 may be implemented inside the display driver circuit 20.

Referring to FIG. 10, the sensor control unit 140 may receive a trimming enable signal from an external device or display driver circuit 20 at block S101. At this time, the trimming enable signal may be a signal for setting the display driver circuit 20 as a test mode to maintain a specific temperature. According to some aspects, the sensor control unit 140 receiving the trimming enable signal may generate a tester drive signal for operating the tester 200 and output the tester drive signal to the tester 200.

The tester 200 sets a specific temperature of the display driver circuit 20 based on the tester driving signal of the sensor control unit 140 at block S201, and compares the proportional voltage Vcore with a trimming table value in real time to output a proportional voltage Vcore having the same voltage level at the same temperature of the display driver circuit 20 at block S202. Then, based on the comparison result, the tester 200 may select a resistance value of the variable resistor $R_{CTAT}$ 123 of the CTAT current unit 122 at block S203.

In this case, the tester 200 may store a value corresponding to a difference between the proportional voltage Vcore and a specific voltage in one-time programmable memory (OTP) or multi-time programmable memory (MTP) in advance. For example, the tester 200 may include a trimming table value for storing trimming values corresponding to differences between the proportional voltage Vcore and a specific voltage.

The sensor control unit 140 may set the resistance value selected by the tester 200 as a resistance value of the variable resistor $R_{CTAT}$ 123 (S102). That is, the sensor control unit 140 may vary the variable resistor $R_{CTAT}$ 123 such that the display driver circuit 20 outputs the same proportional voltage Vcore at the same temperature.

The proportional voltage generating unit 120 may sense a temperature of the display driver circuit 20 and output a proportional voltage Vcore proportional to a temperature change of the display driver circuit 20 at block S103.

The comparison unit 130 may compare magnitudes of the reference voltage Vref and the proportional voltage Vcore output by the reference voltage generating unit 110 at block S104.

According to some aspects, when the voltage value of the proportional voltage Vcore is greater than the voltage value of the reference voltage Vref, the comparison unit 130 may generate and transmit a flag voltage Vflag having a voltage value corresponding to a logic high level to the circuit control unit 150 at block S105.

When the circuit control unit 150 receives the flag voltage Vflag having the voltage value corresponding to a logic high level from the comparison unit 130, the circuit control unit 150 may perform an operation for lowering the temperature of the display driver circuit 20 at block S106.

According to some aspects, to lower the temperature of the display driver circuit 20, the circuit control unit 150 may reset the display driver circuit 20, output an error message to the host 10 such that whether to operate the display driver circuit 20 or not is determined by the host 10, display an error message indicating a high temperature state of the display driver circuit 20 on the display panel 30, or reduce the frame rate of the image data displayed on the display panel 30. That is, the circuit control unit 150 may prevent the display driver circuit 20 from operating in a specific high temperature area in advance.

As described above, according to the temperature sensor provided in the display driver circuit and its operating method according to various some aspects of the present disclosure, with the temperature sensor integrated into the display driver circuit, it is possible to sense the temperature of the display driver circuit, and prevent the display driver circuit from operating in a specific high temperature area.

In addition, according to the temperature sensor provided in the display driver circuit and its operating method according to various some aspects of the present disclosure, it is possible to accurately measure the temperature of the display driver circuit while using a simple structure.

In addition, according to the temperature sensor provided in the display driver circuit and its operating method according to various some aspects of the present disclosure, it is possible to prevent malfunction of the display device that arises due to heat generation of the display driver circuit.

In addition, although it is assumed that the temperature sensor is integrated into the display driver circuit in the above description, the temperature sensor described in this specification may be used in all circuits formed of semiconductors other than the display driver circuit.

Although the present disclosure has been described with reference to the embodiments illustrated in the drawings, this is merely exemplary. It will be understood by those skilled in the art that various modifications and equivalent embodiments thereto may be implemented. Accordingly, the true technical protection scope of the present disclosure should be determined by the following claims.

What is claimed is:

1. A temperature sensor provided in a circuit, comprising:
a reference voltage generating unit configured to output a reference voltage;
a proportional voltage generating unit configured to output a proportional voltage by using a complementary to absolute temperature (CTAT) current inversely proportional to a temperature of the circuit;
a comparison unit configured to output a flag voltage by comparing magnitudes of the reference voltage and the proportional voltage; and
a sensor control unit configured to control the reference voltage generating unit and the proportional voltage generating unit.

2. The temperature sensor of claim 1, wherein the proportional voltage generating unit comprises:
a proportional to absolute temperature (PTAT) current unit configured to generate a PTAT current proportional to the temperature of the circuit;
a CTAT current unit configured to generate the CTAT current inversely proportional to the temperature of the circuit; and
a calculation unit configured to generate the proportional voltage using a value of the PTAT current and a value of the CTAT current,
wherein the CTAT current unit comprises a variable resistor whose resistance value is changed under a control of the sensor control unit.

3. The temperature sensor of claim 2, wherein, when the circuit is set in a test mode to maintain a first temperature, the sensor control unit changes the resistance value of the variable resistor based on a comparison result between a voltage value of the proportional voltage corresponding to the first temperature and a trimming table value.

4. The temperature sensor of claim 1, wherein the comparison unit outputs a first flag voltage when a voltage value of the proportional voltage is less than or equal to a voltage value of the reference voltage, and
outputs a second flag voltage for lowering the temperature of the circuit when the proportional voltage is greater than the reference voltage.

5. The temperature sensor of claim 1, wherein the reference voltage generating unit has a plurality of preset reference voltages,
the sensor control unit generates a reference voltage control signal for selecting one reference voltage from among a plurality of reference voltages and transmits the reference voltage control signal to the reference voltage generating unit, and
the reference voltage generating unit outputs a voltage value of the reference voltage to increase or decrease based on the reference voltage control signal.

6. A display driver circuit, comprising:
a temperature sensor configured to control heat generation of the display driver circuit; and
a circuit control unit configured to perform an operation for lowering a temperature of the display driver circuit,
wherein the temperature sensor comprises:
a reference voltage generating unit configured to output a reference voltage;
a proportional voltage generating unit configured to output a proportional voltage by using a complementary to absolute temperature (CTAT) current inversely proportional to the temperature of the display driver circuit;
a comparison unit configured to output a flag voltage by comparing magnitudes of the reference voltage and the proportional voltage; and
a sensor control unit configured to control the reference voltage generating unit and the proportional voltage generating unit.

7. The display driver circuit of claim 6, wherein the proportional voltage generating unit comprises:
a proportional to absolute temperature (PTAT) current unit configured to generate a PTAT current proportional to the temperature of the display driver circuit;
a CTAT current unit configured to generate the CTAT current inversely proportional to the temperature of the display driver circuit; and
a calculation unit configured to generate the proportional voltage using a value of the PTAT current and a value of the CTAT current,
wherein the CTAT current unit comprises a variable resistor whose resistance value is changed under a control of the sensor control unit.

8. The display driver circuit of claim 6, wherein the comparison unit outputs a first flag voltage when a voltage value of the proportional voltage is less than or equal to a voltage value of the reference voltage, and
outputs a second flag voltage and transmits the second flag voltage to the circuit control unit when the proportional voltage is greater than the reference voltage.

9. The display driver circuit of claim 8, wherein the circuit control unit lowers the temperature of the display driver circuit when receiving the second flag voltage.

10. The display driver circuit of claim 9, wherein the circuit control unit resets the display driver circuit, transmits an error message to a host, displays an error message, or reduces a frame rate to lower the temperature.

11. The display driver circuit of claim 8, wherein the circuit control unit determines a specific temperature corresponding to the reference voltage as a current temperature of the display driver circuit when receiving the first flag voltage.

12. A method for operating a display driver circuit having a temperature sensor, comprising:
setting a proportional voltage generating unit to output a first voltage when the display driver circuit is a first temperature;
controlling a reference voltage generating unit to output a reference voltage based on a temperature of the display driver circuit to be sensed;
outputting a first flag voltage when a proportional voltage output by the proportional voltage generating unit is less than or equal to the reference voltage and outputting a second flag voltage when the proportional voltage is greater than the reference voltage; and
lowering the temperature of the display driver circuit based on the second flag voltage,
wherein setting the proportional voltage generating unit comprises setting a resistance value of a variable resistor included in the proportional voltage generating unit such that the proportional voltage of the proportional voltage generating unit becomes the first voltage.

13. The method of claim 12, wherein lowering the temperature of the display driver circuit comprises:
lowering the temperature of the display driver circuit, by resetting the display driver circuit, transmitting an error message to a host, displaying an error message, or reducing a frame rate.

14. The method of claim 12, wherein setting the resistance value of the variable resistor comprises:

receiving a tester drive signal by a tester;

setting the display driver circuit as a test mode to maintain the first temperature; and setting the resistance value of the variable resistor such that the proportional voltage becomes the first voltage based on a comparison result between a voltage value of the proportional voltage corresponding to the first temperature and a trimming table value.

15. The method of claim 12, wherein controlling the reference voltage generating unit comprises:

selecting one reference voltage from among a plurality of preset reference voltages and setting the selected reference voltage as the reference voltage.

16. A method for sensing a temperature of a display driver circuit, comprising:

setting a reference voltage generating unit to select a reference voltage from among a plurality of preset reference voltages and output the reference voltage such that the reference voltage increases or decreases;

setting a proportional voltage generating unit to output a first voltage when the display driver circuit is at a first temperature;

outputting a first flag voltage when a proportional voltage output by the proportional voltage generating unit is less than or equal to the reference voltage, and outputting a second flag voltage when the proportional voltage is greater than the reference voltage; and determining a temperature of the display driver circuit based on the first and second flag voltages, wherein setting the proportional voltage generating unit comprises setting a resistance value of a variable resistor included in the proportional voltage generating unit such that the proportional voltage of the proportional voltage generating unit corresponds to the first voltage.

17. The method of claim 16, wherein setting the resistance value of the variable resistor comprises:

receiving a tester drive signal from the tester;

setting the display driver circuit to test mode to maintain the first temperature; and setting the resistance value of the variable resistor such that the proportional voltage corresponds to the first voltage based on a comparison result between a proportional voltage corresponding to the first temperature and a trimming table value.

18. The method of claim 16, wherein determining the temperature of the display driver circuit comprises:

determining a specific temperature corresponding to the reference voltage output by the reference voltage generating unit as a current temperature of the display driver circuit when receiving the first flag voltage.

* * * * *